United States Patent
Valeev

(10) Patent No.: US 9,951,956 B2
(45) Date of Patent: Apr. 24, 2018

(54) FUEL NOZZLE ASSEMBLY HAVING A PREMIX FUEL STABILIZER

(71) Applicant: General Electric Company, Schenectady, NY (US)

(72) Inventor: Almaz Kamilevich Valeev, Moscow (RU)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 15/359,686

(22) Filed: Nov. 23, 2016

(65) Prior Publication Data
US 2017/0184308 A1    Jun. 29, 2017

(30) Foreign Application Priority Data

Dec. 28, 2015    (RU) .................................. 2015156419

(51) Int. Cl.
| F23R 3/28 | (2006.01) |
| F23R 3/12 | (2006.01) |
| F23R 3/10 | (2006.01) |
| F02C 3/04 | (2006.01) |
| F23R 3/16 | (2006.01) |
| F23R 3/14 | (2006.01) |
| F23R 3/32 | (2006.01) |

(Continued)

(52) U.S. Cl.
CPC ............... *F23R 3/286* (2013.01); *F02C 3/04* (2013.01); *F23D 14/24* (2013.01); *F23D 14/48* (2013.01); *F23R 3/14* (2013.01); *F23R 3/16* (2013.01); *F23R 3/32* (2013.01); *F05D 2220/32* (2013.01); *F23D 2900/14021* (2013.01)

(58) Field of Classification Search
None
See application file for complete search history.

(56) References Cited

U.S. PATENT DOCUMENTS

| 4,100,733 A | 7/1978 | Striebel et al. |
| 4,177,637 A | 12/1979 | Pask |
| 4,292,801 A | 10/1981 | Wilkes et al. |

(Continued)

FOREIGN PATENT DOCUMENTS

WO    2016/209101 A1    12/2016

OTHER PUBLICATIONS

Extended European Search Report and Opinion issued in connection with corresponding EP Application No. 16205152.8 dated May 22, 2017.

*Primary Examiner* — Gerald L Sung
*Assistant Examiner* — Stephanie Cheng
(74) *Attorney, Agent, or Firm* — Dority & Manning, P.A.

(57) ABSTRACT

A fuel nozzle assembly includes a premix chamber, an air flow divider extending radially and axially within the premix chamber between an inner wall and an outer wall and a plurality of guide vanes disposed within the premix chamber. One or more of the guide vanes includes a fuel port in fluid communication with the flow divider. The fuel nozzle assembly further includes a premix plate that extends radially between the inner and outer walls and circumferentially between first and second side walls downstream from the fuel ports. The premix plate includes an upstream side axially spaced from a downstream side and a plurality of passages that provide for fluid flow from the premix chamber through the premix plate.

20 Claims, 7 Drawing Sheets

(51) Int. Cl.
  *F23D 14/24* (2006.01)
  *F23D 14/48* (2006.01)

(56) References Cited

U.S. PATENT DOCUMENTS

| | | | |
|---|---|---|---|
| 4,408,461 A | 10/1983 | Bruehwiler et al. | |
| 4,967,561 A | 11/1990 | Bruehwiler et al. | |
| 4,982,570 A | 1/1991 | Waslo et al. | |
| 5,199,265 A | 4/1993 | Borkowicz | |
| 5,259,184 A | 11/1993 | Borkowicz et al. | |
| 5,319,936 A | 6/1994 | Ikeda et al. | |
| 5,343,693 A | 9/1994 | Komatsu et al. | |
| 5,359,847 A | 11/1994 | Pillsbury et al. | |
| 5,394,688 A | 3/1995 | Amos | |
| 5,475,979 A | 12/1995 | Oag et al. | |
| 5,592,821 A | 1/1997 | Alary et al. | |
| 5,619,855 A | 4/1997 | Burrus | |
| 5,660,044 A | 8/1997 | Bonciani et al. | |
| 5,839,283 A | 11/1998 | Dobbeling | |
| 5,899,074 A | 5/1999 | Komatsu et al. | |
| 5,937,653 A | 8/1999 | Alary et al. | |
| 6,038,861 A | 3/2000 | Amos et al. | |
| 6,282,904 B1 | 9/2001 | Kraft et al. | |
| 6,286,298 B1 | 9/2001 | Burrus et al. | |
| 6,295,801 B1 | 10/2001 | Burrus et al. | |
| 6,564,555 B2 | 5/2003 | Rice et al. | |
| 7,143,583 B2 | 12/2006 | Hayashi et al. | |
| 7,200,998 B2 | 4/2007 | Inoue et al. | |
| 7,313,919 B2 | 1/2008 | Inoue et al. | |
| 8,276,385 B2 | 10/2012 | Zuo et al. | |
| 8,322,143 B2 | 12/2012 | Uhm et al. | |
| 8,424,311 B2 | 4/2013 | York et al. | |
| 8,539,773 B2 | 9/2013 | Ziminsky et al. | |
| 2007/0113555 A1* | 5/2007 | Carroni | F23D 14/02 60/737 |
| 2008/0101926 A1* | 5/2008 | Becker | F23R 3/10 415/208.1 |
| 2013/0025285 A1* | 1/2013 | Stewart | F02C 7/2365 60/740 |
| 2013/0219899 A1 | 8/2013 | Uhm et al. | |
| 2014/0216054 A1* | 8/2014 | Ostebee | F02C 3/14 60/796 |
| 2014/0238025 A1* | 8/2014 | Uhm | F23R 3/286 60/737 |
| 2014/0238036 A1 | 8/2014 | Uhm et al. | |
| 2014/0311150 A1 | 10/2014 | Pinson et al. | |
| 2015/0167982 A1 | 6/2015 | Bellino et al. | |
| 2016/0281978 A1* | 9/2016 | Fernandes | F23D 11/38 |

* cited by examiner

US 9,951,956 B2

FUEL NOZZLE ASSEMBLY HAVING A PREMIX FUEL STABILIZER

TECHNICAL FIELD OF THE INVENTION

The present invention generally relates to a fuel nozzle assembly for use in a combustor of a gas turbine. More particularly, this invention relates to a fuel nozzle assembly having a premix plate for flame stabilization downstream from a fuel injection location.

BACKGROUND OF THE INVENTION

A typical gas turbine includes an inlet section, a compressor section, a combustion section, a turbine section, and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid and a fuel are mixed within the combustion section and burned in a combustion chamber to generate combustion gases having a high temperature and pressure. The combustion gases are routed along a hot gas path into the turbine section where they expand to produce work. For example, expansion of the combustion gases in the turbine section may rotate a shaft connected to a generator to produce electricity.

The combustion section generally includes one or more combustors annularly arranged and disposed between the compressor section and the turbine section. Various parameters influence the design and operation of the combustors. For example, gas turbine manufacturers are regularly tasked to increase gas turbine efficiency without producing undesirable air polluting emissions. The primary air polluting emissions typically produced by gas turbines burning conventional hydrocarbon fuels are oxides of nitrogen (NOx), carbon monoxide (CO), and unburned hydrocarbons (UHCs). Oxidation of molecular nitrogen and thus the formation of NOx in air-breathing engines such as gas turbines is an exponential function of temperature. The higher the temperature of the combustion gases, the higher the rate of formation of the undesirable NOx emissions.

One way to lower the temperature of the combustion gases, thus controlling the formation of NOx, is to pre-mix fuel and air upstream from a combustion reaction zone within the combustion chamber using a premix type of fuel injector or fuel nozzle assembly, such as a swirler or swozzle type fuel nozzle assembly. In this type of fuel nozzle assembly, fuel is injected into a flow of compressed air within an annular flow or premix passage defined within the fuel nozzle assembly. The fuel and compressed air mixes within the annular passage and is then routed into the combustion chamber from a downstream end of the fuel nozzle assembly. During combustion, the heat capacity or thermal capacitance of excess air present in the air-rich or fuel-lean combustible mixture absorbs heat in the combustion chamber, thus reducing the temperature of the combustion gases, thereby decreasing or preventing the formation of NOx emissions.

A flow field of the lean combustible mixture within the premix passage and entering the combustion chamber at the injection point should be uniform or symmetric in order to reduce the potential for flame holding and to achieve desired emissions performance. Accordingly, continued improvements in current fuel nozzle assembly technologies would be useful.

BRIEF DESCRIPTION OF THE INVENTION

Aspects and advantages of the invention are set forth below in the following description, or may be obvious from the description, or may be learned through practice of the invention.

One embodiment of the present invention is a fuel nozzle assembly for a gas turbine. The fuel nozzle assembly includes a premix chamber defined between an arcuate inner wall, an arcuate outer wall, a first side wall and a circumferentially opposing second side wall. An air flow divider extends radially between the inner wall and the outer wall and extends axially within the premix chamber. The air flow divider defines an internal fuel circuit. A plurality of guide vanes is disposed within the premix chamber. At least one guide vane extends circumferentially between the air flow divider and one of the first side wall or the second side wall. One or more of the guide vanes includes a fuel port that is in fluid communication with the fuel circuit. A premix plate extends radially between the inner and outer walls and circumferentially between the first and second side walls downstream from the fuel ports. The premix plate includes an upstream side axially spaced from a downstream side and a plurality of passages. The passages provide for fluid flow from the premix chamber through the premix plate.

Another embodiment of the present invention is a combustor for a gas turbine. The combustor generally includes a combustion chamber defined within the combustor and a fuel nozzle assembly that is disposed upstream from the combustion chamber. The fuel nozzle assembly comprises a premix chamber defined between an arcuate inner wall, an arcuate outer wall, a first side wall and a circumferentially opposing second side wall. An air flow divider extends radially between the inner wall and the outer wall and extends axially within the premix chamber. The air flow divider defines an internal fuel circuit. A plurality of guide vanes is disposed within the premix chamber. At least one guide vane extends circumferentially between the air flow divider and one of the first side wall or the second side wall. One or more of the guide vanes includes a fuel port that is in fluid communication with the fuel circuit. A premix plate extends radially between the inner and outer walls and circumferentially between the first and second side walls downstream from the fuel ports and upstream from the combustion chamber. The premix plate includes an upstream side axially spaced from a downstream side and a plurality of passages. The passages provide for fluid flow from the premix chamber through the premix plate and into the combustion chamber.

Another embodiment of the present invention includes a gas turbine. The gas turbine generally includes a compressor, a combustor disposed downstream from the compressor, and a turbine disposed downstream from the combustor. The combustor includes an end cover that is coupled to an outer casing and a combustion chamber that is defined within the outer casing. A fuel nozzle assembly extends downstream from the end cover and terminates upstream from the combustion chamber. The fuel nozzle assembly comprises a premix chamber defined between an arcuate inner wall, an arcuate outer wall, a first side wall and a circumferentially opposing second side wall. An air flow divider extends radially between the inner wall and the outer wall and extends axially within the premix chamber. The air flow divider defines an internal fuel circuit. A plurality of guide vanes is disposed within the premix chamber. At least one guide vane extends circumferentially between the air flow divider and one of the first side wall or the second side wall. One or more of the guide vanes includes a fuel port in fluid communication with the fuel circuit. A premix plate extends radially between the inner and outer walls and circumferentially between the first and second side walls downstream from the fuel ports and upstream from the combustion chamber. The premix plate includes an upstream side axially spaced from a downstream side and a plurality of passages. The upstream side of the fuel nozzle assembly includes a plurality of concentrically aligned annular walls and a plurality of circumferentially spaced radial walls that extend radially between radially adjacent annular walls. The annular walls and the radial walls at least partially define an inlet to each passage and the passages provide for fluid flow from the premix chamber through the premix plate and into the combustion chamber.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
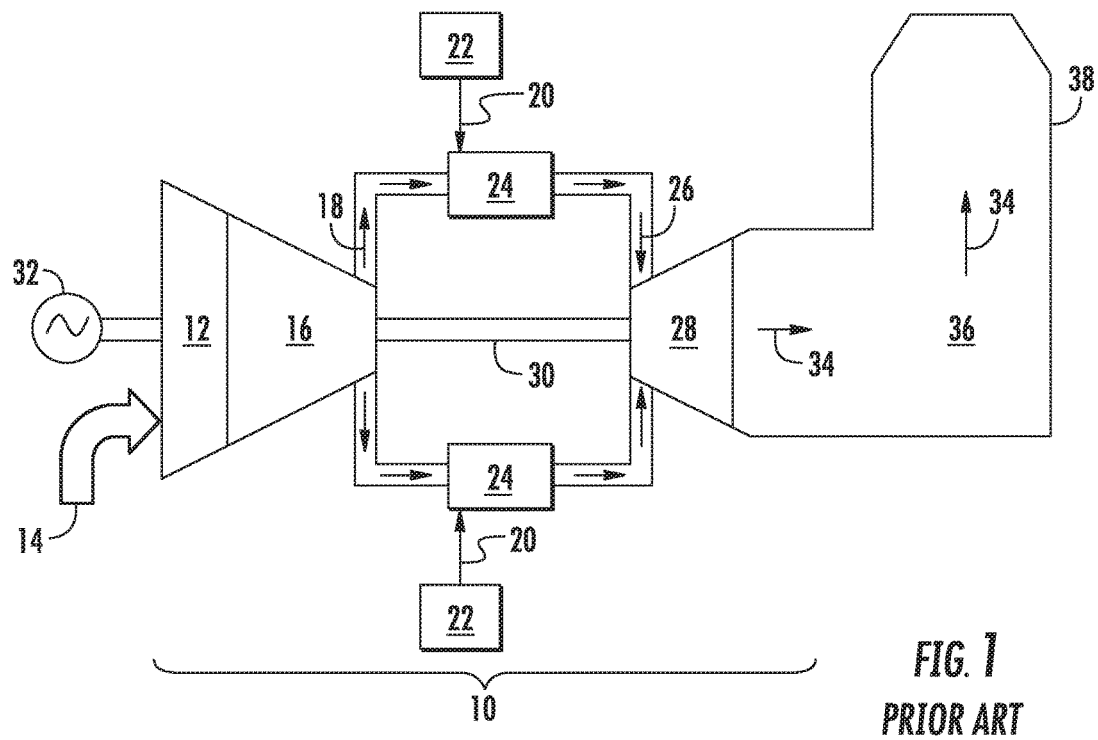
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow. The term "circumferentially" refers to a relative direction that extends around an axial centerline CL of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel 20 from a fuel supply system 22 to form a combustible mixture within one or more combustors 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
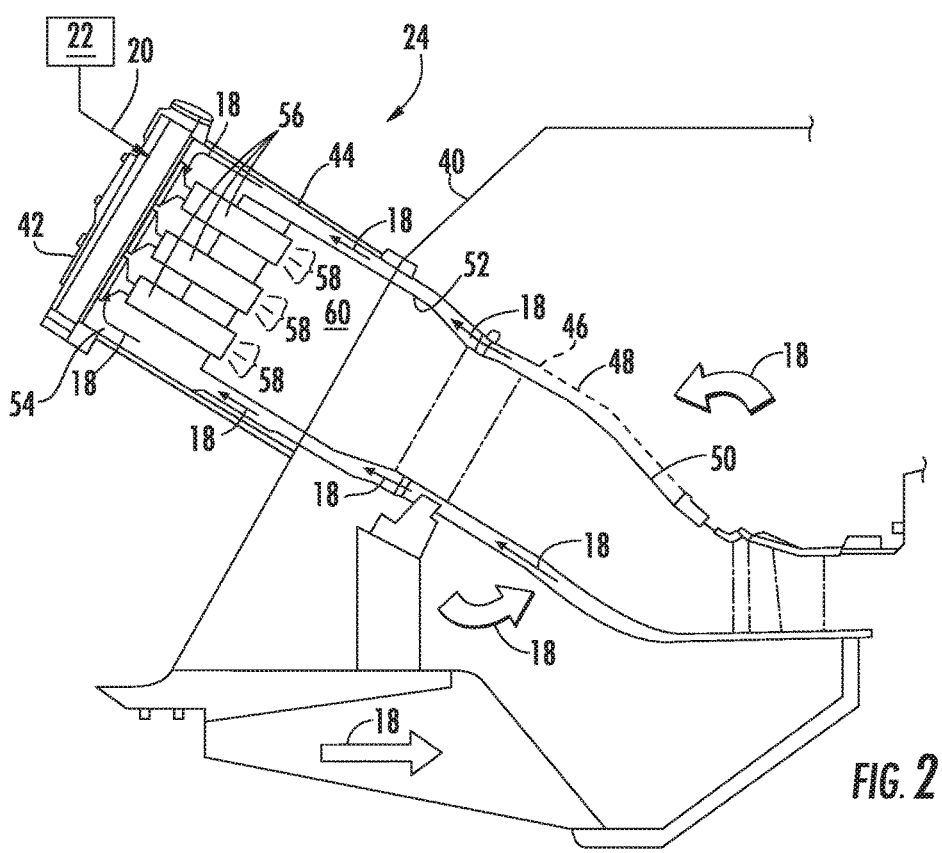
FIG. 2 is a simplified cross-section side view of an exemplary combustor as may incorporate various embodiments of the present invention.

The combustors 24 may be any type of combustor known in the art, and the present invention is not limited to any particular combustor design unless specifically recited in the claims. For example, the combustor 24 may be a can or can-annular type of combustor. FIG. 2 provides a simplified cross-section side view of an exemplary combustor 24 that may incorporate various embodiments of the present invention. As shown in FIG. 2, a casing 40 (such as compressor discharge casing) and an end cover 42 may be coupled together via a combustor casing 44 to contain the compressed working fluid 18 flowing to the combustor 24 from the compressor 16 (FIG. 1). The compressed working fluid 18 may pass through flow holes 46 in a flow sleeve 48, such as an impingement sleeve or a combustion flow sleeve, to flow along the outside of a transition duct 50 and/or a liner 52 towards a head end 54 of the combustor 24.

The head end 54 is at least partially defined by the end cover 42 and/or the combustor casing 44. The compressed working fluid 18 may provide convective and/or conductive cooling to the transition duct 50 and/or to the liner 52 as it flows towards the head end 54. At the head end 54, the compressed working fluid 18 reverses in flow direction and flows through a plurality of fuel nozzle assemblies 56. The fuel nozzle assemblies 56 may comprise a plurality of sector shaped fuel nozzle assemblies which are annularly arranged around a center fuel nozzle assembly. The fuel 20 flows from the fuel supply system 22 through one or more fuel circuits (not shown) defined within the end cover 42 and into each or some of the fuel nozzle assemblies 56. The fuel supply system 22 may provide a gaseous and/or a liquid fuel to the combustor 24. The compressed working fluid 18 is premixed with the fuel 20 as it passes through the fuel nozzle assemblies 56 to form a combustible mixture 58. The combustible mixture 58 flows from the fuel nozzle assemblies 56 into a combustion chamber 60 for combustion.

Figure 3:
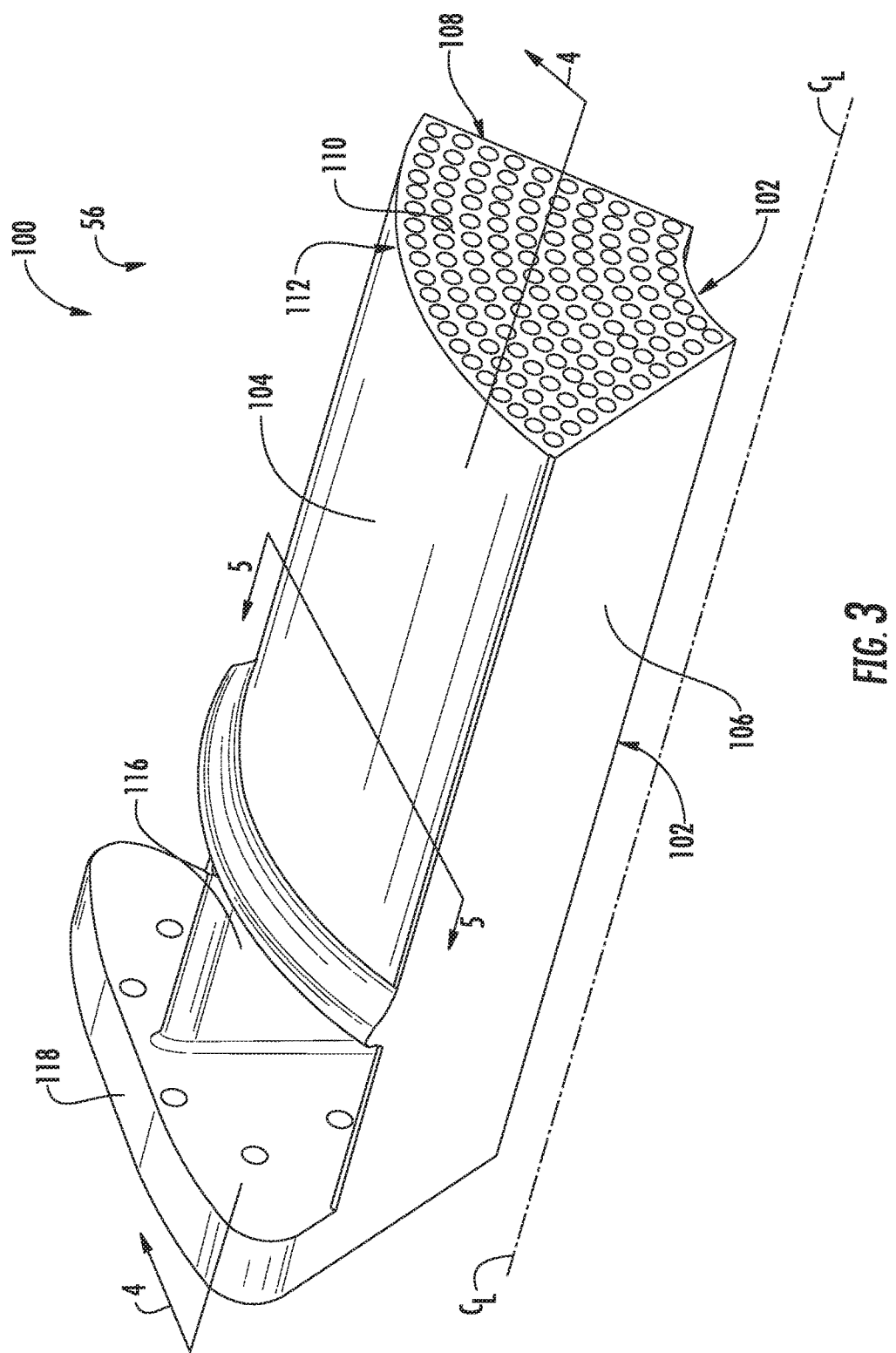
FIG. 3 is a perspective view of an exemplary fuel nozzle assembly according to at least one embodiment of the present invention.
Figure 4:
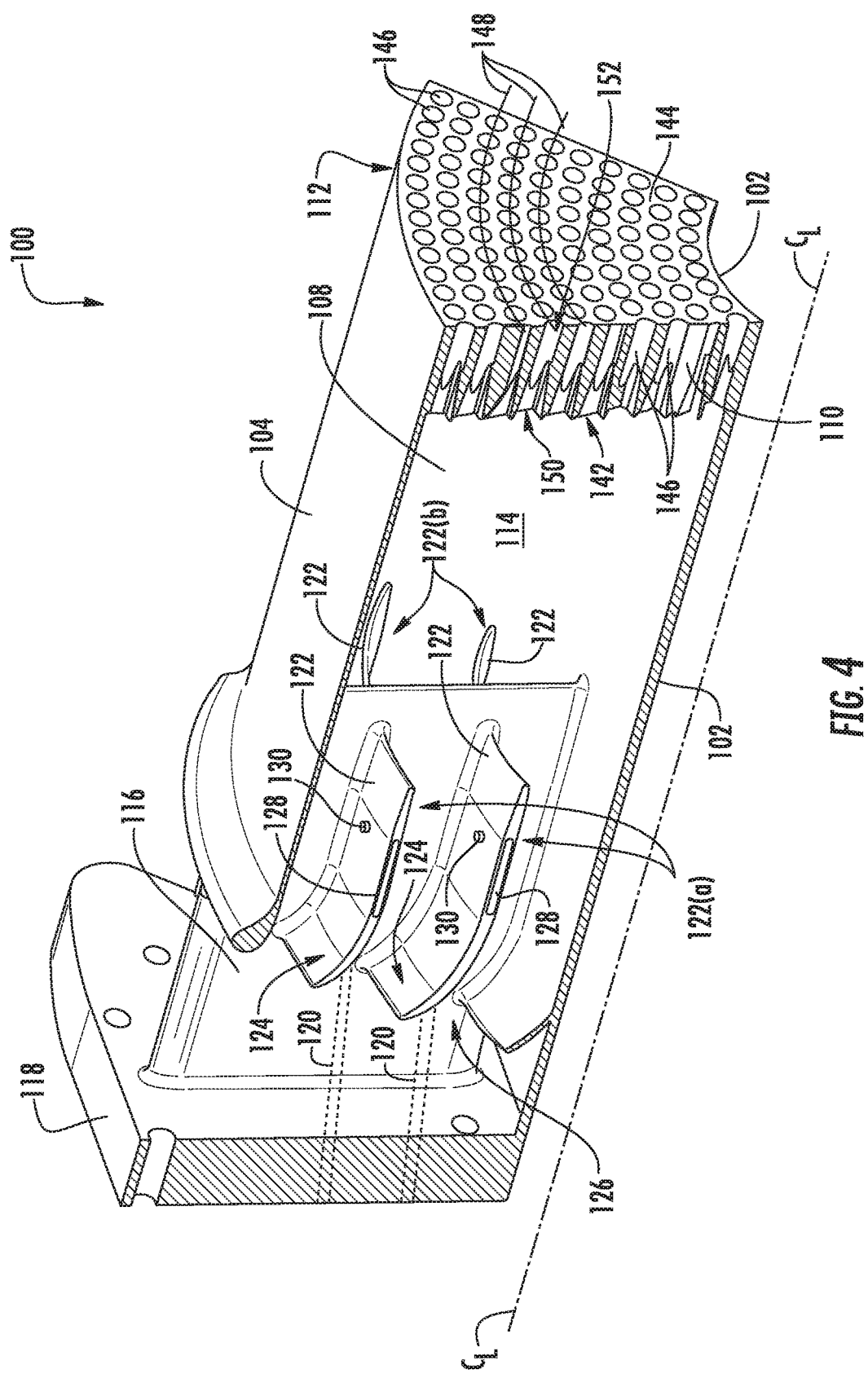
FIG. 4 is a cross sectioned perspective view of the exemplary fuel nozzle assembly taken along section line 4-4 as shown in FIG. 3, according to at least one embodiment of the present invention.

FIG. 3 provides a perspective view of an exemplary fuel nozzle assembly 100 of the one or more fuel nozzle assemblies 56 as shown in FIG. 2, according to one embodiment of the present invention. FIG. 4 provides a cross sectioned perspective side view of the fuel nozzle assembly 100 taken along section line 4-4 as shown in FIG. 3, according to one embodiment of the present invention. The fuel nozzle assembly 100 may be used as an outer fuel nozzle that is annularly or circumferentially arranged about a center fuel nozzle assembly such as in a 5 around 1 fuel nozzle configuration. In various embodiments, as shown in FIGS. 3 and 4, the fuel nozzle assembly 100 includes an arcuate shaped inner wall or liner 102, an arcuate shaped outer wall or liner 104 radially spaced from the inner wall 102, a first side wall 106 (FIG. 3) circumferentially spaced from a second side wall 108 (FIG. 4) and a premix plate 110 disposed at a downstream end portion 112 of the fuel nozzle assembly 100. The first side wall 106 and the second side wall 108 extend radially from the inner liner 102 to the outer liner 104. The premix plate 110 extends radially with respect to centerline CL between the inner wall 102 and the outer wall 104 and circumferentially between the first side wall 106 and the second side wall 108.

As shown in FIGS. 3 and 4 collectively, the inner wall 102, outer wall 104, first side wall 106 (FIG. 3) and second side wall 108 define a premix flow passage or chamber 114 (FIG. 4) within the fuel nozzle assembly 100. As shown in FIGS. 3 and 4, an air flow divider 116 extends axially from a base portion 118 of the fuel nozzle assembly 100 into the premix chamber 114 with respect to centerline CL. As shown in FIG. 4, the air flow divider 116 extends radially from or between the inner wall 102 and the outer wall 104. In various embodiments, as shown in FIG. 4, the wall defines or includes one or more internal fuel circuits 120 (as shown in dashed lines). In various embodiments, the premix plate 110 generally provides a bluff body across the premix flow chamber 114 upstream from the combustion chamber 60 (FIG. 2).

Figure 5:
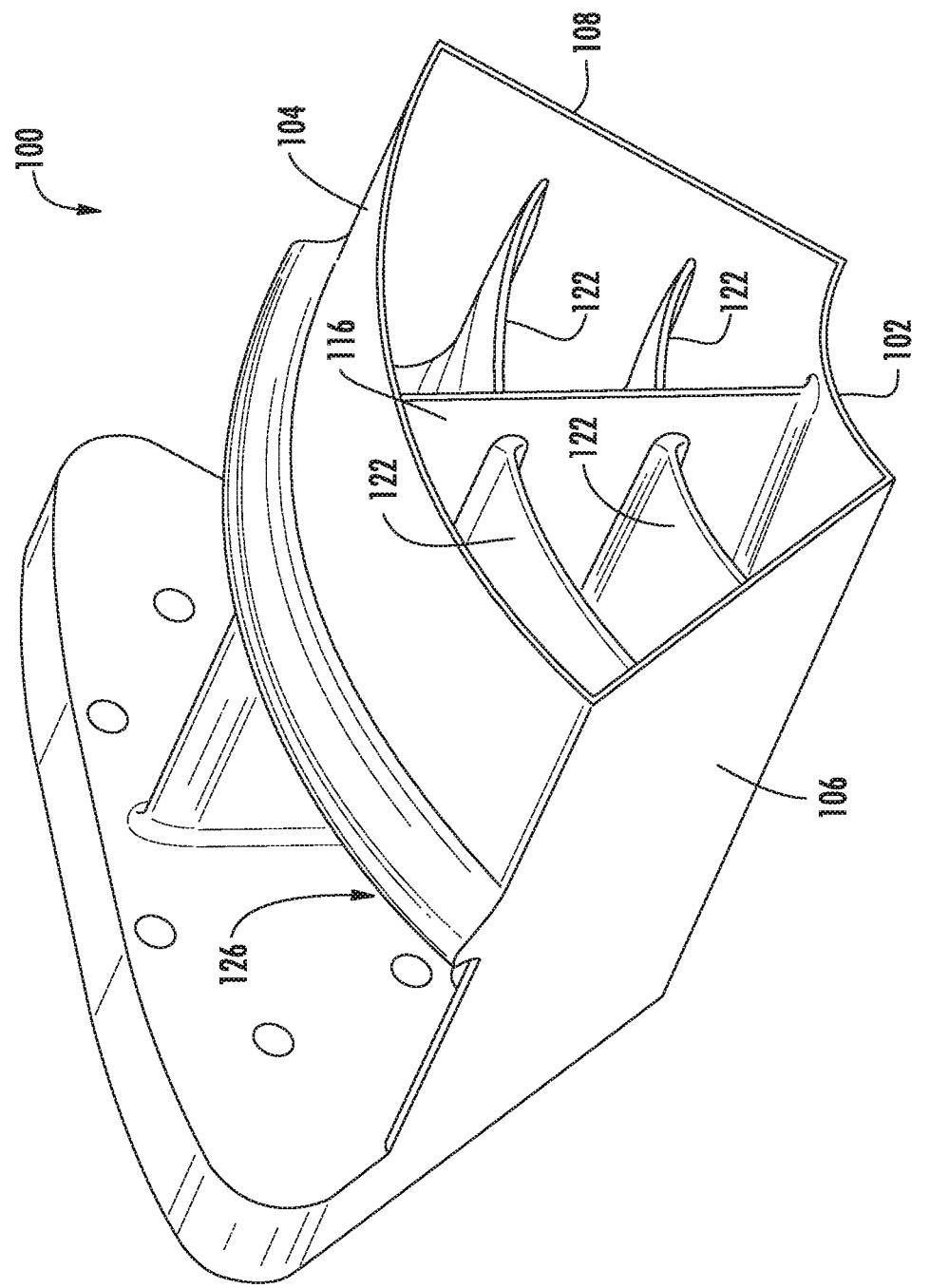
FIG. 5 is a cross sectioned upstream perspective view of a portion the exemplary fuel nozzle assembly taken along section line 5-5 as shown in FIG. 3, according to at least one embodiment of the present invention.

FIG. 5 provides a cross sectioned perspective view of the fuel nozzle assembly 100 taken along section line 5-5 as shown in FIG. 3. In various embodiments, as shown in FIGS. 4 and 5, the fuel nozzle assembly 100 includes a plurality of guide vanes 122. The guide vanes 122 extend axially or substantially axially along the air flow divider 116, have a radial thickness and extend at least partially within the premix chamber 114. In particular embodiments, as shown in FIG. 4, an upstream portion 124 of each or at least one guide vane 122 may curve radially outwardly towards the outer wall 104 (as shown).

In particular embodiments, as shown in FIGS. 4 and 5, the fuel nozzle assembly 100 includes a first set 122(*a*) of the guide vanes 122 that extend circumferentially between the air flow divider 116 and the first side wall 106 and a second set 122(*b*) of the guide vanes 122 that extend circumferentially between the wall 106 and the second side wall 108. The first set 122(*a*) and the second set 122(*b*) of the guide vanes 122 is not limited to any particular number of guide vanes 122 unless otherwise recited in the claims. For example, in particular embodiments, as shown in FIGS. 4 and 5, the first set 122(*a*) and the second set 122(*b*) of guide vanes 122 may each include two guide vanes 122.

In various embodiments, as shown in FIG. 4, one or more of the guide vanes 122 include a fuel passage 128 and one or more fuel port(s) 130. In various embodiments, the fuel passage(s) 128 and the fuel port(s) 130 may be in fluid communication with the fuel circuit(s) 120 defined within and/or by the air flow divider 116. The fuel circuit(s) 120 may be in fluid communication with the fuel supply system 22 (FIG. 2), for example, via the end cover 42 (FIG. 2). The fuel port(s) 130 provide for fluid communication between the fuel passage(s) 128 and the premix chamber 114. The curved upstream portion 124 of the guide vanes 122 may manipulate flow characteristics or flow profile of the compressed air 18 (FIG. 2) as it flows from the head end 54 of the combustor 24 into the premix chamber 114 upstream from the fuel ports 130.

Figure 6:
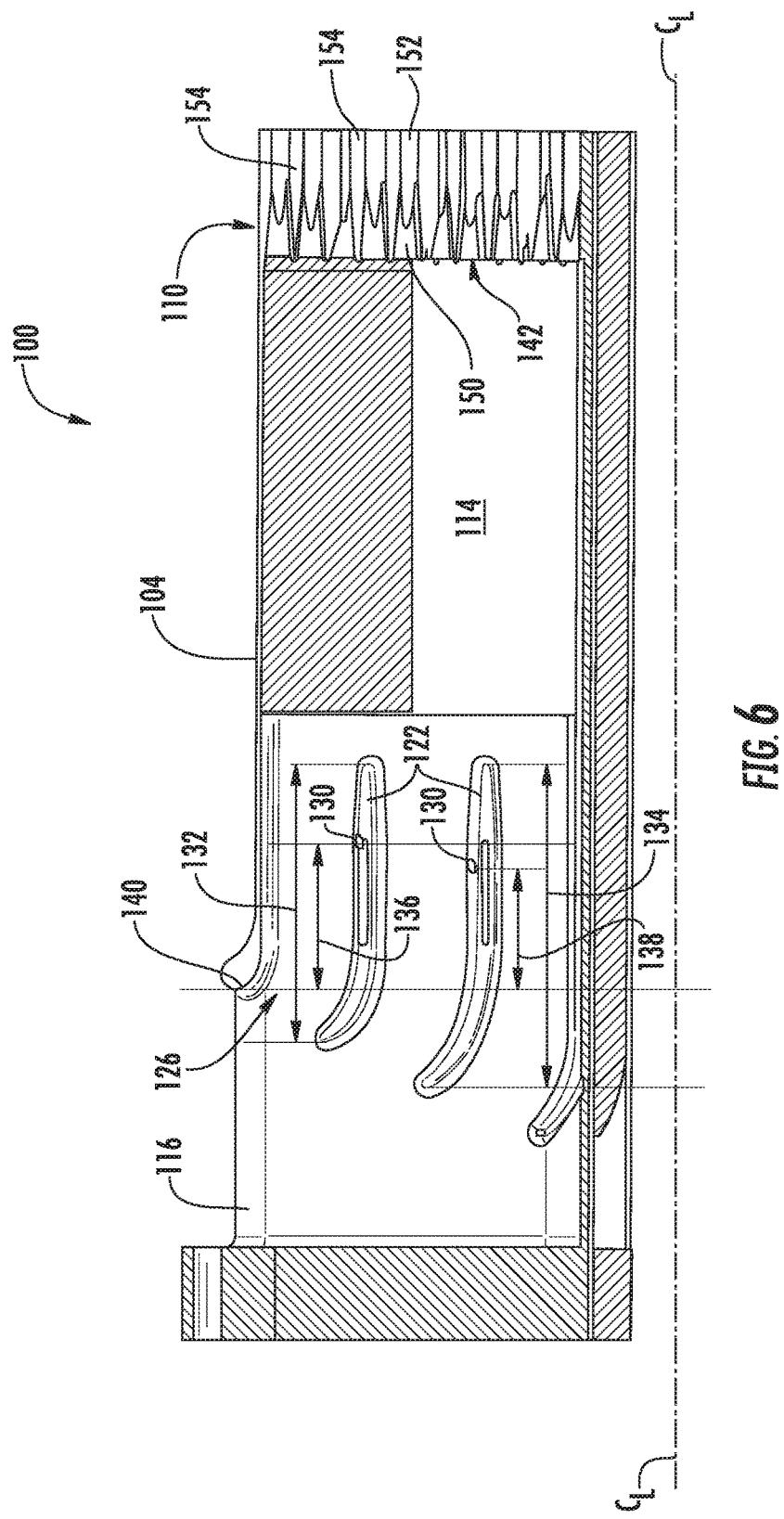
FIG. 6 is a cross sectioned side view of the exemplary fuel nozzle as shown in FIG. 4, according to one embodiment of the present invention.

FIG. 6 provides a cross sectioned side view of the fuel nozzle assembly 100 as shown in FIG. 4, according to at least one embodiment of the present invention. In particular embodiments, as shown in FIG. 6, the guide vanes 122 may extend axially along the air flow divider 116 at varying axial distances 132, 134. In particular embodiments, the fuel ports 130 may be axially offset. For example, the fuel ports 130 may be disposed along the guide vanes 122 at varying axial distances 136, 138 within the premix chamber 114 as measured from an inlet 126 to the premix chamber or an upstream end 140 of the outer wall 104 or in the alternative, as measured from an upstream side 142 of the premix plate 110, thus providing axial fuel staging capability and/or benefits within the premix chamber 114.

Figure 7:
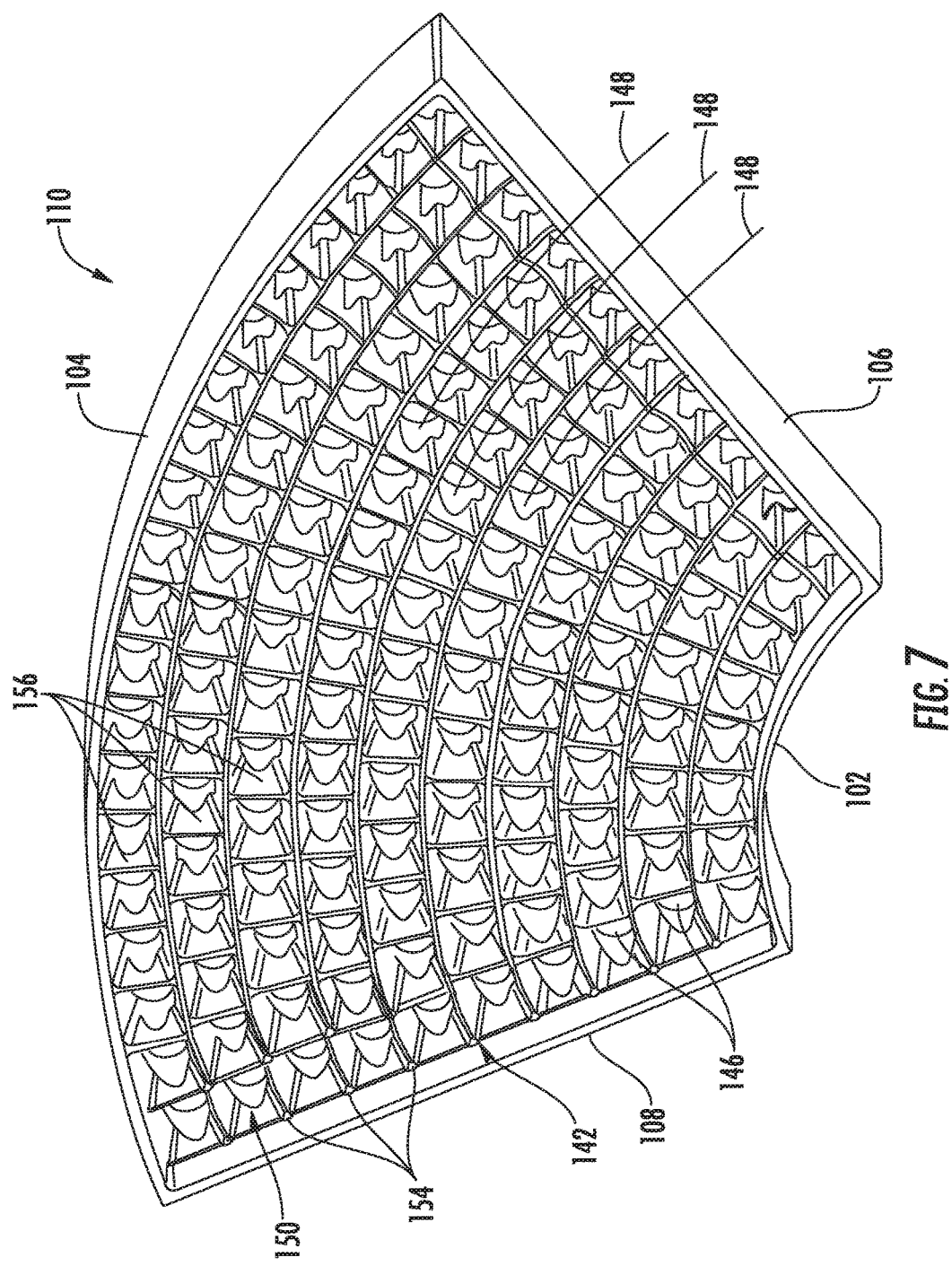
FIG. 7 is a downstream perspective view of a premix plate of the fuel nozzle assembly as shown in FIG. 4, according to at least one embodiment of the present invention.

FIG. 7 provides an enlarged downstream perspective view of the premix plate 110 as shown in FIGS. 4 and 6 according to one embodiment of the present invention. As shown in FIGS. 4 and 7 collectively, the premix plate 110 includes the upstream side 142 which is axially spaced from a downstream or flame side 144. As shown in FIGS. 4 and 7 collectively, the premix plate 110 defines or at least partially defines a plurality of passages 146 that extend generally axially through the upstream and downstream sides 142, 144.

In particular embodiments, as shown in FIGS. 4 and 7, the passages 146 may be arranged so as to form multiple circumferential rows 148 which are radially stacked between the inner wall 102 and the outer wall 104. Each circumferential row 148 is radially separated from an adjacent row circumferential row 148. Although the passages 146 are shown as having a generally circular cross sectional shape, it is to be understood that the passages 146 are not limited to any particular cross sectional shape unless specifically provided in the claims. For example, the passages 146 may have an arcuate, rectangular, triangular or trapezoidal cross sectional shape.

As shown in FIGS. 4 and 7, each passage 146 includes an inlet 150 defined along the upstream side 142 and an outlet 152 (FIG. 4) defined along the downstream side 144. The inlets 150 are in fluid communication with the premix flow passage 114 and with the outlets 152. At least some of the passages 146 provide for fluid flow from the premix flow passage 114, through the premix plate 110 and into the combustion chamber 60 (FIG. 2).

The inlets 150 and the outlets 152 may be provided with different shapes, such that premixing of a fuel-air mixture entering the passages 146 from the premix chamber 114 is maximized at the inlets 150 and that discrete fuel-air jets are formed at the outlets 152. To minimize the likelihood of flame holding, the transition from the shape of the inlets 150 to the shape of the outlets 152 is smooth or non-turbulent. In one embodiment, the inlet 150 has a larger area than the outlet 152, thereby accelerating the flow of the fuel-air mixture through the premix plate 110.

In various embodiments, as shown in FIGS. 6 and 7 collectively, the upstream side 142 of the premix plate 110 may include and/or define a plurality of concentrically aligned annular walls 154 that extend axially and radially with respect to centerline CL and circumferentially between the first side wall 106 and the second side wall 108. Each annular wall 154 is radially spaced from an adjacent annular wall 154 or walls. The annular walls 154 radially separate or isolate the inlets 150 and the outlets 152 of radially adjacent passages 146.

In various embodiments, as shown in FIG. 7, the premix plate includes and/or at least partially defines a plurality of circumferentially spaced radial walls 156 that extend radially between radially adjacent annular walls 154 and/or the inner wall 102 or the outer wall 104. The radial walls 156 circumferentially separate or isolate circumferentially adjacent passages 146 and/or inlets 150 to adjacent passages 146. The annular walls 154 and the radial walls 156 surround and/or at least partially define the inlets 150 to each passage 146, thereby maximizing the area through which the fuel-air mixture flows into the premix plate 110 and minimizing dead space that would otherwise occur between adjacent passages, for example, if their circular shape were continuous from the inlets 150 to the outlets 152. In particular embodiments, one or more of the passages 146 are blended into or with the corresponding annular wall 154 and/or the corresponding radial wall 156.

Figure 8:
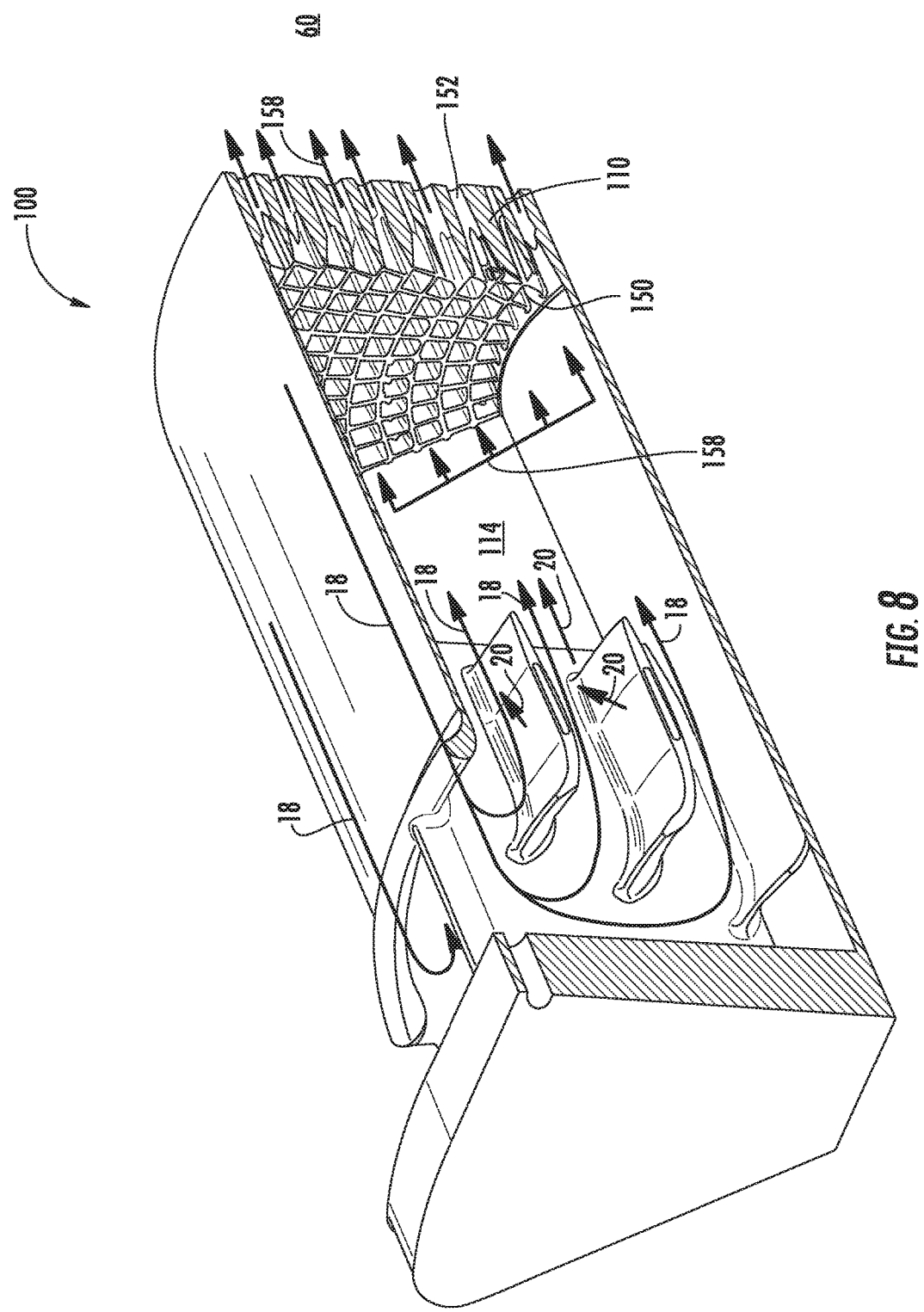
FIG. 8 is a downstream perspective view of the fuel nozzle assembly as shown in FIG. 4 and provides an operational flow diagram of the fuel nozzle assembly according to at least one embodiment of the present invention.

FIG. 8 provides a downstream perspective view of the cross section fuel nozzle as shown in FIG. 4, according to one embodiment of the present invention, and also provides an operational flow diagram of the fuel nozzle assembly 100. During operation, as shown in FIG. 8, compressed air 18 from the head end 54 (FIG. 2) of the combustor 24 (FIG. 2) is routed through the inlet 126 to the premix chamber 114, while fuel 20 is injected into the flow of compressed air 18 via the various fuel ports 130 defined within the guide vanes 122. In particular embodiments, the compressed air 18 may be preconditioned upstream from the plurality of fuel ports 130 via the guide vanes 122, thus manipulating the flow characteristics or flow profile of the compressed air 18 as it flows from the head end 54 of the combustor 24 into the premix chamber 114 upstream from the fuel ports 130.

The fuel 20 and compressed air 18 mix together within the premix chamber 114, thus providing a fuel-air mixture as indicated by arrows 158 upstream from the inlets 150. The various surface features defined along the upstream or inlet side 142 of the premix plate 110 such as the annular and radial walls 154, 156 and/or the blended inlets 150 provide generally aerodynamically clean inlets 150 to the passages 146, thus providing flame stabilization at and/or downstream from the outlets 152 of the passages 146. In addition or in the alternative, the passages 146 may promote further or more complete premixing of the fuel-air mixture 158 upstream from the combustion chamber 60, thus enhancing overall emissions performance of the combustor 24. The fuel-air mixture 158 enters the combustion chamber 60 in a flow direction that is substantially axial (that is, without the swirl, or tangential flow direction, typically associated with swirler or swozzle-type premixing fuel nozzles). As a result, the flame front is shorter and exhibits flame stability.

This written description, which includes the best mode, uses examples to disclose the invention and to enable any person skilled in the art to practice the invention, including making and using any devices or systems and performing any incorporated methods. The patentable scope of the invention is defined by the claims, and may include other examples that occur to those skilled in the art. Such other examples are intended to fall within the scope of the claims if they include structural elements that do not differ from the literal language of the claims, or if they include equivalent structural elements with insubstantial differences from the literal language of the claims.

What is claimed:

1. A fuel nozzle assembly comprising:
a premix chamber defined between an arcuate inner wall, an arcuate outer wall, a first side wall and a circumferentially opposing second side wall;
the first side wall and the second side wall each extending between and contacting the arcuate inner wall and the arcuate outer wall;
an air flow divider contacting and extending radially between the inner wall and the outer wall, and extending axially within the premix chamber, wherein the airflow divider defines an internal fuel circuit;
a plurality of guide vanes disposed within the premix chamber, wherein at least one guide vane contacts and extends circumferentially between the air flow divider and one of the first side wall or the second side wall, wherein one or more of the guide vanes includes a fuel port in fluid communication with the fuel circuit;
and a premix plate that extends radially between the inner and outer walls and circumferentially between the first and second side walls downstream from the fuel ports, wherein the premix plate includes an upstream side axially spaced from a downstream side and a plurality of passages, wherein the passages provide for fluid flow from the premix chamber through the premix plate.

2. The fuel nozzle assembly as in claim 1, wherein the upstream side of the premix plate includes a plurality of concentrically aligned annular walls and a plurality of circumferentially spaced radial walls that extend radially between radially adjacent annular walls, wherein the annular walls and the radial walls at least partially define inlets to each passage.

3. The fuel nozzle assembly as in claim 2, wherein the passages are blended with the annular walls and the radial walls proximate to the inlet of each passage.

4. The fuel nozzle assembly as in claim 1, wherein one or more of the guide vanes at least partially defines a fuel passage therein.

5. The fuel nozzle assembly as in claim 1, wherein the flow divider is connected to a base portion of the fuel nozzle assembly.

6. The fuel nozzle assembly as in claim 1, wherein an upstream portion of at least one guide vane of the plurality of guide vanes is curved radially towards the outer wall.

7. The fuel nozzle assembly as in claim 1, wherein the plurality of guide vanes comprises a first set of guide vanes that extend circumferentially between the flow divider and the first side wall and a second set of guide vanes that extend circumferentially between the flow divider and the second side wall.

8. The fuel nozzle assembly as in claim 1, wherein the plurality of guide vanes extends axially along the air flow divider at varying axial distances.

9. The fuel nozzle assembly as in claim 1, wherein the fuel ports of two or more guide vanes of the plurality of guide vanes are axially offset.

10. A combustor for a gas turbine, comprising:
a combustion chamber defined within the combustor;
and a fuel nozzle assembly comprising:
a premix chamber defined between an arcuate inner wall, an arcuate outer wall, a first side wall and a circumferentially opposing second side wall;
the first side wall and the second side wall each extending between and contacting the arcuate inner wall and the arcuate outer wall;
an air flow divider contacting and extending radially between the inner wall and the outer wall, and extending axially within the premix chamber, wherein the air flow divider defines an internal fuel circuit;
a plurality of guide vanes disposed within the premix chamber, wherein at least one guide vane contacts and extends circumferentially between the air flow divider and one of the first side wall or the second side wall, wherein one or more of the guide vanes includes a fuel port in fluid communication with the fuel circuit;
and a premix plate that extends radially between the inner and outer walls and circumferentially between the first and second side walls downstream from the fuel ports and upstream from the combustion chamber, wherein the premix plate includes an upstream side axially spaced from a downstream side and a plurality of passages, wherein the passages provide for fluid flow from the premix chamber through the premix plate and into the combustion chamber.

11. The combustor as in claim 10, wherein the upstream side of the premix plate includes a plurality of concentrically aligned annular walls and a plurality of circumferentially spaced radial walls that extend radially between radially adjacent annular walls, wherein the annular walls and the radial walls at least partially define inlets to each passage.

12. The combustor as in claim 11, wherein the passages are blended with the annular walls and the radial walls proximate to the inlet of each passage.

13. The combustor as in claim 10, wherein one or more of the guide vanes at least partially defines a fuel passage therein.

14. The combustor as in claim 10, wherein the flow divider is connected to a base portion of the fuel nozzle assembly.

15. The combustor as in claim 10, wherein an upstream portion of at least one guide vane of the plurality of guide vanes is curved radially towards the outer wall.

16. The combustor as in claim 10, wherein the plurality of guide vanes comprises a first set of guide vanes that extend circumferentially between the flow divider and the first side wall and a second set of guide vanes that extend circumferentially between the flow divider and the second side wall.

17. The combustor as in claim 10, wherein the plurality of guide vanes extends axially along the air flow divider at varying axial distances.

18. The combustor as in claim 10, wherein the fuel ports of two or more guide vanes of the plurality of guide vanes are axially offset.

19. A gas turbine, comprising:
a compressor, a combustor disposed downstream from the compressor and a turbine disposed downstream from the combustor, wherein the combustor includes an end cover coupled to an outer combustor casing, a combustion chamber defined within the outer combustor casing and a fuel nozzle assembly that extends downstream from the end cover and terminates upstream from the combustion chamber;
wherein the fuel nozzle assembly comprises:
a premix chamber defined between an arcuate inner wall, an arcuate outer wall, a first side wall and a circumferentially opposing second side wall;
the first side wall and the second side wall each extending between and contacting the arcuate inner wall and the arcuate outer wall
an air flow divider contacting and extending radially between the inner wall and the outer wall, and extending axially within the premix chamber, wherein the air flow divider defines an internal fuel circuit;
a plurality of guide vanes disposed within the premix chamber, wherein at least one guide vane contacts and extends circumferentially between the air flow divider and one of the first side wall or the second side wall, wherein one or more of the guide vanes includes a fuel port in fluid communication with the fuel circuit;
and a premix plate that extends radially between the inner and outer walls and circumferentially between the first and second side walls downstream from the fuel ports and upstream from the combustion chamber, wherein the premix plate includes an upstream side axially spaced from a downstream side and a plurality of passages, wherein the upstream side of the fuel nozzle assembly includes a plurality of concentrically aligned annular walls and a plurality of circumferentially spaced radial walls that extend radially between radially adjacent annular walls, wherein the annular walls and the radial walls at least partially define an inlet to one or more of the passages and wherein the passages provide for fluid flow from the premix chamber through the premix plate and into the combustion chamber.

20. The gas turbine as in claim 19, wherein the plurality of guide vanes comprises a first set of guide vanes that extend circumferentially between the flow divider and the first side wall and a second set of guide vanes that extend circumferentially between the flow divider and the second side wall, wherein the fuel ports of two or more guide vanes of the first set of guide vanes or the second set of guide vanes are axially offset.

* * * * *